US009909237B2

(12) United States Patent
Woodruff et al.

(10) Patent No.: US 9,909,237 B2
(45) Date of Patent: Mar. 6, 2018

(54) NON-KINKING SELF-WRAPPING WOVEN SLEEVE AND METHOD OF CONSTRUCTION THEREOF

(71) Applicant: Federal-Mogul Powertrain, Inc., Southfield, MI (US)

(72) Inventors: Alexa A. Woodruff, Philadelphia, PA (US); Cassie M. Malloy, Blue Bell, PA (US); David A. Harris, Coatesville, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 504 days.

(21) Appl. No.: 14/172,715

(22) Filed: Feb. 4, 2014

(65) Prior Publication Data

US 2014/0220846 A1 Aug. 7, 2014

Related U.S. Application Data

(60) Provisional application No. 61/760,607, filed on Feb. 4, 2013.

(51) Int. Cl.
*D03D 41/00* (2006.01)
*D03D 1/00* (2006.01)
(Continued)

(52) U.S. Cl.
CPC ............ *D03D 1/0041* (2013.01); *B32B 1/08* (2013.01); *B32B 5/024* (2013.01); *B32B 5/24* (2013.01);
(Continued)

(58) Field of Classification Search
USPC .............................................. 623/1.49–1.54
See application file for complete search history.

(56) References Cited

U.S. PATENT DOCUMENTS

| 4,282,284 A | 8/1981 | George |
| 4,929,478 A | 5/1990 | Conaghan et al. |

(Continued)

FOREIGN PATENT DOCUMENTS

| CN | 1277643 A | 12/2000 |
| CN | 1849423 A | 10/2006 |

(Continued)

OTHER PUBLICATIONS

International Search Report dated Apr. 2, 2014 (PCT/US2014/014639).

*Primary Examiner* — Arti Singh-Pandey
(74) *Attorney, Agent, or Firm* — Robert L. Stearns; Dickinson Wright, PLLC

(57) ABSTRACT

A wrappable textile sleeve and method of construction thereof is provided. The wrappable textile sleeve includes an elongate wall extending along a longitudinal axis between opposite ends with lengthwise extending edges extending parallel or substantially parallel with the longitudinal axis between the opposite ends. The wall is woven from lengthwise extending warp yarns and circumferentially extending weft yarns. The weft yarns form a plurality of discrete annular bands, with adjacent bands having weft yarns of different diameters to provide the wall with discrete enhanced hoop strength regions and with discrete enhanced flexibility regions, where the enhanced hoop strength and enhanced flexibility regions alternate in adjacent relation with one another.

8 Claims, 2 Drawing Sheets

(51) Int. Cl.
  *B32B 5/24* (2006.01)
  *D03D 13/00* (2006.01)
  *D03D 15/00* (2006.01)
  *H02G 15/18* (2006.01)
  *B32B 5/02* (2006.01)
  *B32B 1/08* (2006.01)

(52) U.S. Cl.
  CPC ........... *D03D 1/0035* (2013.01); *D03D 13/00* (2013.01); *D03D 15/0094* (2013.01); *D03D 41/00* (2013.01); *H02G 15/18* (2013.01); *B32B 2307/54* (2013.01); *B32B 2571/00* (2013.01); *Y10T 442/322* (2015.04)

(56) References Cited

U.S. PATENT DOCUMENTS

| | | | |
|---|---|---|---|
| 5,165,887 A | 11/1992 | Ahmady | |
| 5,413,149 A | 5/1995 | Ford et al. | |
| 5,437,315 A | 8/1995 | Ward | |
| 5,556,495 A | 9/1996 | Ford et al. | |
| 5,613,522 A | 3/1997 | Ford et al. | |
| 5,843,542 A | 12/1998 | Brushafer et al. | |
| 6,984,596 B2 | 1/2006 | Dickerson | |
| 7,174,074 B2 | 2/2007 | Morris | |
| 7,216,678 B2 | 5/2007 | Baer | |
| 7,300,554 B2 | 11/2007 | LaFond et al. | |
| 7,395,680 B2 | 7/2008 | Baer et al. | |
| 7,410,550 B2 | 8/2008 | Sherwin | |
| 7,442,875 B2 | 10/2008 | Burdy et al. | |
| 7,600,539 B2 | 10/2009 | Malloy et al. | |
| 9,028,937 B2 | 5/2015 | Harris et al. | |
| 2009/0311456 A1 | 12/2009 | Harris | |
| 2011/0023988 A1 | 2/2011 | Ludwig et al. | |
| 2011/0083879 A1 | 4/2011 | Avula | |
| 2011/0275268 A1 | 11/2011 | Harris et al. | |
| 2012/0037263 A1 | 2/2012 | Malloy | |
| 2015/0233029 A1* | 8/2015 | Woodruff | D04B 21/14 428/34.1 |

FOREIGN PATENT DOCUMENTS

| | | |
|---|---|---|
| CN | 101945755 A | 1/2011 |
| CN | 102057207 A | 5/2011 |
| JP | 2001522950 A | 11/2001 |
| JP | 2005337831 A | 12/2005 |
| WO | 2012024272 A | 2/2012 |

\* cited by examiner

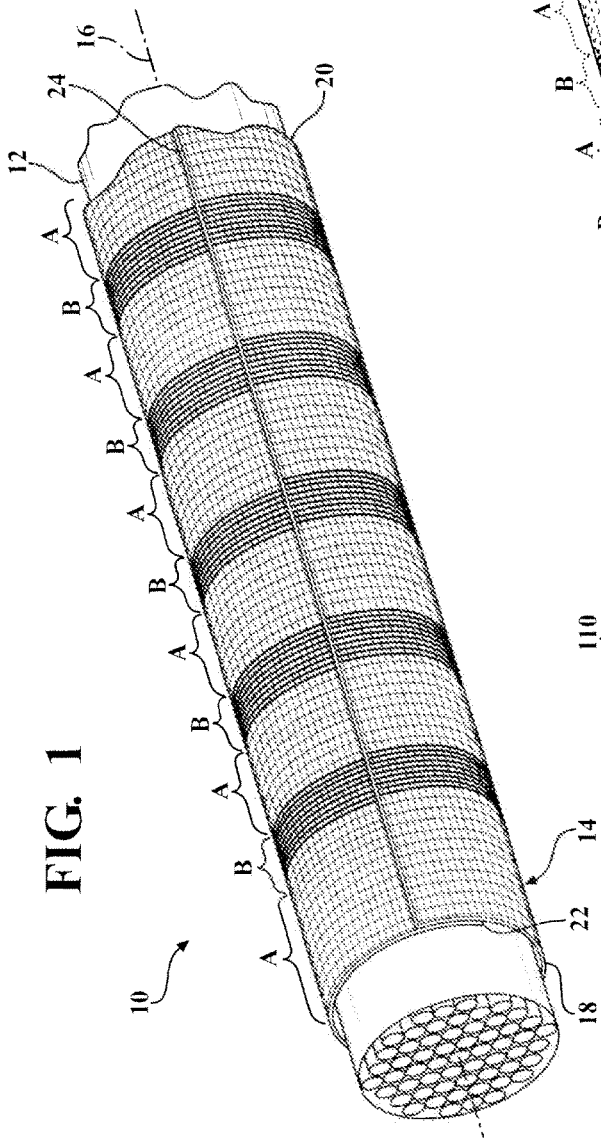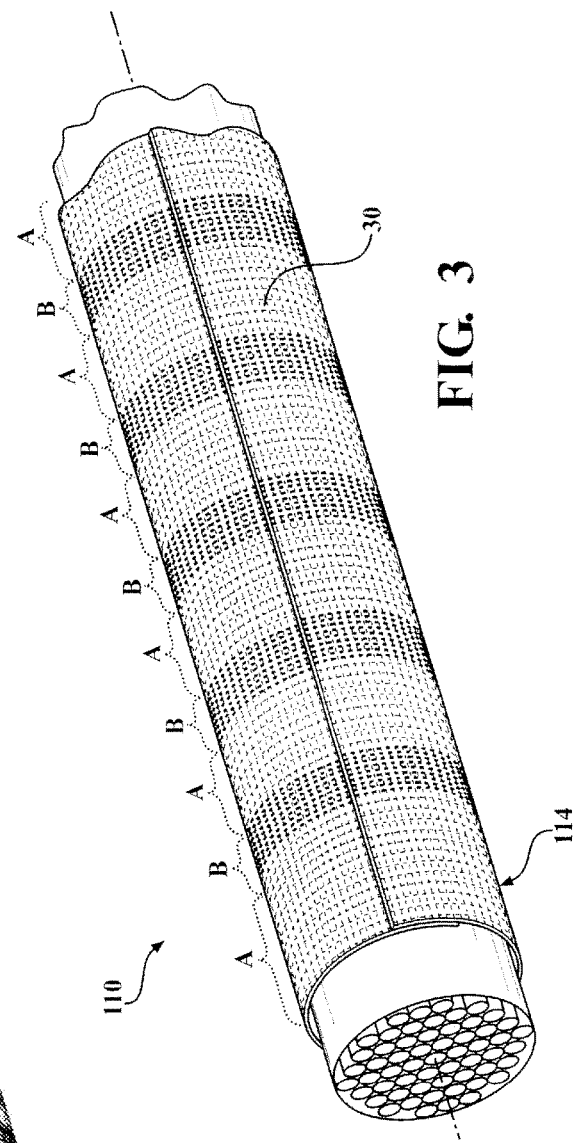

NON-KINKING SELF-WRAPPING WOVEN SLEEVE AND METHOD OF CONSTRUCTION THEREOF

CROSS-REFERENCE TO RELATED APPLICATION

This application claims the benefit of U.S. Provisional Application Ser. No. 61/760,607, filed Feb. 4, 2013, which is incorporated herein by reference in its entirety.

BACKGROUND OF THE INVENTION

1. Technical Field

This invention relates generally to protective textile sleeves for protecting elongate members, and more particularly, to open wrappable woven protective sleeves.

2. Related Art

It is known to utilize textile sleeves to protect elongate members from a variety of external environmental conditions. Woven sleeves can either be formed having a seamless, tubular wall, or an open, wrappable wall having opposite lengthwise extending edges configured to overlap one another. Wrappable woven sleeves are typically constructed with relatively stiff weft monofilament yarns (also referred to as fill yarns) that extend widthwise and circumferentially about the wall to provide the sleeve with high hoop strength, thereby inhibiting the sleeve from being crushed or flattened. Unfortunately, although woven sleeves having stiff weft yarns attain high hoop strength, they have limited flexibility along their length, thereby reducing their ability to be routed about circuitous, meandering paths, and if bent too much, cause the sleeve wall to kink and form openings along a seam between the overlapping edges, wherein the openings formed provide a source for ingress of contamination, whether fluid or solid in form. In some cases, in order to provide a more flexible sleeve when increased flexibility is necessary, woven wrappable sleeves are fabricated in their entirety from more flexible multifilament weft yarns or from very fine, small diameter weft monofilaments; however, these sleeves, although having an increased flexibility, suffer from a greatly reduced hoop strength, and thus, are prone to being crushed or flattened in use, thereby subjecting the elongate members being protected therein to damage.

Accordingly, what is needed is a woven textile sleeve that combines the benefits of a woven sleeve having both a high hoop strength and a woven sleeve that is flexible, thereby providing protection against being crushed, while at the same time, being flexible, non-kinking, and resisting the formation of opening between overlapping edges when routed over circuitous, meandering paths and when bent around corners of 90 degrees or more.

SUMMARY OF THE INVENTION

In accordance with one aspect of the invention, a wrappable textile sleeve is provided. The textile sleeve includes an elongate wall extending along a longitudinal axis between opposite ends with lengthwise extending edges extending parallel or substantially parallel with the longitudinal axis between the opposite ends. The wall is woven from lengthwise extending warp yarns and circumferentially extending weft yarns. The weft yarns form a plurality of discrete annular bands, with adjacent bands having weft yarns of different diameters.

In accordance with one aspect of the invention, a method of constructing a wrappable textile sleeve is provided. The method includes weaving an elongate wall from lengthwise extending warp yarns extending parallel or substantially parallel with a longitudinal axis between opposite ends of the wall and circumferentially extending weft yarns extending generally transverse with the longitudinal axis between opposite edges that extend along the longitudinal axis between the opposite ends. Further, forming a plurality of discrete circumferentially extending annular bands extending between the opposite edges with the weft yarns during the weaving process with adjacent bands being formed with weft yarns having different diameters from one another.

The woven, self-wrapping sleeve provides the desired protection to elongate members contained therein, while also having an enhanced degree of flexibility to allow the sleeve to be routed about corners of 90 degrees or more without kinking and/or causing an opening to be formed between opposite, overlapping lengthwise extending edges. The enhanced flexibility is provided by forming alternating discrete, flexible bands spaced axially from one another by intervening bands, wherein the flexible bands are formed in their entirety with weft yarns having a decreased diameter relative to the intervening bands. In contrast, the intervening bands are formed having weft yarns with relatively increased diameters relative to the adjacent, flexible bands, wherein the intervening bands with increased diameter weft yarns provide enhanced hoop strength to the wall of the sleeve, thereby providing crush resistance to the wall.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a perspective view of a woven, wrappable sleeve constructed in accordance with one aspect of the invention shown wrapped about an elongate member to be protected by the sleeve;

FIG. 3 is a view similar to FIG. 1 of a woven, wrappable sleeve constructed in accordance with another aspect of the invention shown wrapped about an elongate member to be protected.

DETAILED DESCRIPTION OF PRESENTLY PREFERRED EMBODIMENTS

Figure 2:
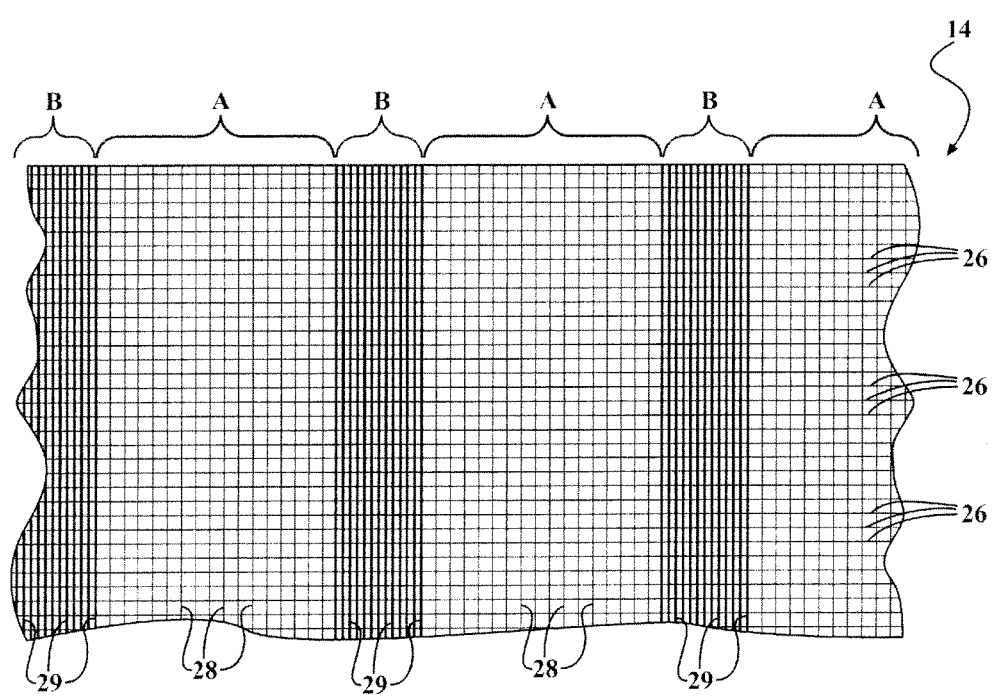
FIG. 2 is an enlarged partial view of a wall of the sleeve of FIG. 1.

Referring in more detail to the drawings, FIG. 1 illustrates a textile sleeve 10 constructed in accordance with one aspect of the invention wrapped about an elongate member 12 (e.g. flexible wire harness or other flexible member) to be protected. The sleeve 10 has an elongate wall 14 that extends along a central longitudinal axis 16 between opposite ends 18, 20 with lengthwise extending edges 22, 24 extending along the longitudinal axis 16 in parallel or substantially parallel relation therewith between the opposite ends 18, 20. As best shown in FIG. 2, the wall 14 is woven from at least one or a plurality of lengthwise extending warp yarns 26 and a plurality of circumferentially extending weft yarns 28, 29. The respective weft yarns 28, 29 are woven to form a plurality of discrete annular bands, shown here, by way of example and without limitation, as alternating pairs of bands A, B extending and alternating in adjacent relation with one another along the longitudinal axis 16 with immediately adjacent bands A, B having respective weft yarns 28, 29 with different diameters from one another. For purposes of distinction, the bands A alternate along the length of the sleeve 10 with bands B intervening between the alternating bands A, such that the individual bands A are spaced axially from one another, as are the bands B. As shown, the bands A are woven from weft yarns 28 having a first diameter and the bands B are woven from weft yarns 29 having a second diameter, wherein the first and second diameters are different from one another, represented as the first diameter being smaller than the second diameter. As such, the sleeve 10 is formed having varying physical properties along the length of the sleeve 10 due to the different diameters of the weft yarns 28, 29 in the respective bands A, B. The bands A, having the very fine, relative small diameter monofilament weft yarns 28, provide the sleeve 10 with enhanced flex regions that result in an enhanced ability of the sleeve 10 to flex and bend around corners, including corners of 90 degrees or more, without kinking and without forming openings or gaps between the overlapping edges 22, 24. Meanwhile, the bands B, having the larger diameter monofilament weft yarns 29 relative to the weft yarns 28, provide the sleeve 10 with stiff, rigid regions relative to the bands A, thereby providing the wall 14 with enhanced hoop strength to prevent the wall 14 from being flattened or crushed, thereby providing the elongate member 12 contained within the sleeve 10 with protection against damage from being crushed.

The warp yarn 26 can be provided of any suitable yarn material, including monofilament or multifilament yarn, and in any suitable number of ends. Preferably the warp yarn 26 is provided at least in part of multi-filament yarn, and preferably entirely from multifilament yarn to enhance the coverage protection provided by the wall 14 to the enclosed elongate member 12.

The weft yarns 28, 29 are provided as monofilament yarn within both bands A, B, and can be provided at least in part as heat-settable monofilament yarn, if desired to heat-set the wall 14 into a thermally formed, self-wrapping wall. The alternating bands A and intervening bands B, as discussed above, have differently sized weft monofilaments relative to one another, thereby providing the sleeve with bands A having an increased flexibility and the bands B having an increased hoop and crush strength. In accordance with one aspect of the invention, the reduced diameter well yarns 28 in the flexible bands A are about ⅓ the diameter of the more stiff well yarns 29 forming the more rigid bands B. Accordingly, the bands A, B have weft yarns 28, 29 with a ratio in diameters of about 1:3, respectively, which has been found to provide the sleeve 10 with both excellent bending flexibility and radial crush strength performance.

The bands A, B are sized in axially extending widths relative with one another to provide the desired amount of flex (bands A) and hoop strength (bands B), while at the same time preventing the wall 14 from kinking and forming openings/gaps along the seam between the overlapping edges 22, 24. Accordingly, the overlapping edges 22, 24 are assured of remaining in their intended overlapped relation with one another to best prevent the ingress of contamination, whether fluid contamination or solid contamination. In one presently preferred embodiment, the axially extending widths of the bands A are greater than the axially extending widths of the bands B, which has been found to provide the desired flexibility and hoop strength, wherein the bands A were about 2 times the width of the bands B, thereby forming a ratio of widths of about 2:1 for the bands A, B, respectively. If the relative axially extending widths of the bands A, B is not maintained, the wall 14 can either sacrifice the hoop strength desired, such as if the bands A are too wide relative to the bands B, or the wall can be too stiff and lack the flexibility desired, thereby causing the wall 14 to be subject to kinking and forming openings/gaps along the seam between the edges 22, 24, such as if the bands B are too wide relative to the bands A. Accordingly, it should be recognized that a balance needs to be maintained between the respective widths of the bands A, B to provide the sleeve 10 with the ability to flex without kinking and forming openings/gaps, while also retaining the desired hoop strength without being too stiff.

If the sleeve 10 is intended to be used as a "standalone" sleeve, thereby being free of any additional layers, then the wall 14 is woven having a relatively high density of yarn in both the warp and weft directions so that the weave construction is tight and the yarns 26, 28, 29 do not have freedom to move relative to one another. This is preferably achieved by weaving the wall 14 in a relatively high warp and pick count in a plain weave pattern. The tight weave pattern also enhances the ability of the sleeve 10 to resist abrasion. Otherwise, as shown in an alternate embodiment of the invention in FIG. 3, wherein the same reference numerals, offset by a factor of 100, are used to identify like features, if the sleeve 110 has an outer layer 30 bonded to an outer surface of the wall 114, such as a layer of foil, then the density of the warp yarn is significant reduced from that for the standalone sleeve 10 shown in FIG. 1, such as 1 warp yarn every 0.7", by way of example, and wherein the fill density will be dependent on the warp and fill yarn size. The reduced density of the warp yarn allows the sleeve 110 to remain flexible without causing the foil layer 30 to tear.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A wrappable textile sleeve, comprising:
an elongate wall extending along a longitudinal axis between opposite ends with lengthwise extending edges extending along said longitudinal axis between said opposite ends, said wall being woven from at least one lengthwise extending warp yarn and a plurality of circumferentially extending weft yarns, said weft yarns forming a plurality of discrete annular bands, each of said bands being formed including a plurality of said weft yarns, with adjacent bands being formed with weft yarns of different diameters from one another, wherein said adjacent bands are formed with weft yarns having a diameter ratio of about 1:3.

2. The wrappable textile sleeve of claim 1 wherein alternating bands are spaced from one another by intervening bands, said alternating bands having weft yarns with substantially the same diameter as one another and said intervening bands having weft yarns of a different diameter from said alternating bands.

3. The wrappable textile sleeve of claim 2 wherein said alternating bands are formed entirely from weft yarns having a larger diameter relative to said weft yarns forming said intervening bands.

4. The wrappable textile sleeve of claim 1 wherein said weft yarns are monofilaments and said at least one warp yarn is a multifilament.

5. The wrappable textile sleeve of claim 1 wherein said wall is woven in a plain weave.

6. The wrappable textile sleeve of claim 1 further comprising an outer layer bonded to an outer surface of said wall.

7. The wrappable textile sleeve of claim 6 wherein said outer layer is foil.

8. The wrappable textile sleeve of claim 1 wherein at least some of said weft yarns are heat-set to bias said opposite edges into overlapping relation with one another.

* * * * *